United States Patent [19]
Machi et al.

[11] 3,901,778
[45] Aug. 26, 1975

[54] NOVEL PROCESS FOR PREPARING CALCIUM SULFATE

[75] Inventors: Sueo Machi, Takasaki; Takayuki Shinano, Yokohama; Yasushi Matui, Saitama; Yoshiharu Hibi, Yokohama, all of Japan

[73] Assignees: Japan Atomic Energy Research Institute, Minato; Maruzen Oil Company Ltd., Osaka; Mitsubishi Kakoki Kaisha Ltd., Chiyoda, all of Japan

[22] Filed: Dec. 26, 1972

[21] Appl. No.: 318,216

[30] Foreign Application Priority Data
Dec. 24, 1971  Japan.............................. 46-104702
Mar. 6, 1972  Japan................................ 47-22300

[52] U.S. Cl.......................................... 204/157.1 H
[51] Int. Cl................................................. B01j 1/10
[58] Field of Search............................. 204/157.1 H

[56] References Cited
FOREIGN PATENTS OR APPLICATIONS
80,751  5/1963  France......................... 204/157.1 R

*Primary Examiner*—Howard S. Williams
*Attorney, Agent, or Firm*—Stevens, Davis, Miller & Mosher

[57] ABSTRACT

In a process for preparing calcium sulfate by oxidizing the system comprising calcium sulfite and water, the oxidation reaction is much accelerated by irradiation with an ionizing radiation. When the system is kept in acidic state, the reaction is further accelerated.

4 Claims, 1 Drawing Figure

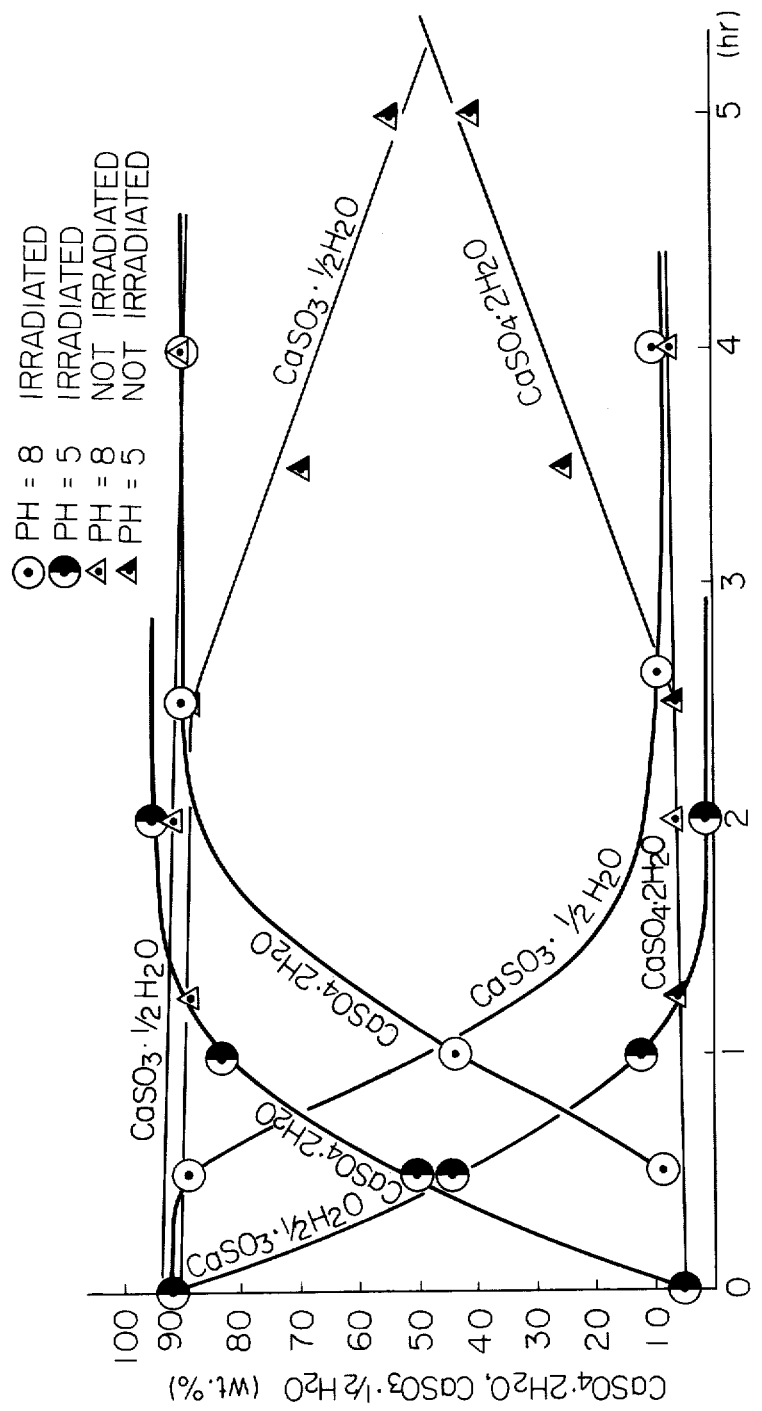

NOVEL PROCESS FOR PREPARING CALCIUM SULFATE

BACKGROUND OF THE INVENTION

1. Field of the Invention

The present invention relates to a process characterized by the irradiation of an ionizing radiation to alkaline, neutral or acidic reaction system, in the production of calcium sulfate from calcium sulfite, and is mainly characterized in that the formation rate of calcium sulfate is considerably accelerated.

2. Description of the Prior Art

The most part of gypsum for practical use has been a natural gypsum and the chemical gypsum obtained as the byproducts of phosphorus acid industries. However, a production process of gypsum is recently being noted with keen interest, which uses large quantity of sulfur dioxide gas resulted from desulfurization process of exhausted smoke in order to prevent contamination of atmosphere. Moreover, by this process, gypsum with higher purity than those by the conventional processes can be obtained. The process comprises; first stage reaction in which sulfur dioxide gas is allowed to react with calcium oxide or calcium hydroxide, by passing the above gas through slurry comprising above oxide or hydroxide and water to obtain calcium sulfite, and second stage reaction in which above calcium sulfite is oxidized, by bubbling air or oxygen gas through the slurry comprising above calcium sulfite and water to form calcium sulfate. Since the second stage reaction (oxidation reaction) proceeds very slowly under usual conditions, it is a rate determination step through over all reactions, and therefore, it has been an important problem to accelerate the oxidation reaction.

SUMMARY OF THE INVENTION

An object (A) in the present invention is to provide a novel process for preparing calcium sulfate, characterized by irradiating of an ionizing radiation, in the production of calcium sulfate by oxidizing calcium sulfite in the presence of water. The system comprising calcium sulfite and water is generally alkaline and shows pH of about 8.

The present inventors have found that the above oxidation reaction of calcium sulfite is accelerated by the irradiation of an ionizing radiation. After the experiments were carried out, it was confirmed that the reaction is considerably accelerated by the irradiation. It is of worth that a novel effective production process of high purity gypsum was presented, without addition of any kind of catalyst. The gypsum obtained by the process is useful as the raw material not only for gypsum board and blending material for cement but also for various kind of composites.

The accelerating mechanism of the oxidation in the present invention is estimated as follows. Since the diffusion of oxygen into the crystalline of calcium sulfite is difficult, the oxidation reaction is considered to take place in a liquid phase, by the reaction of oxygen with the sulfurous acid ions which are dissociated by dissolving of small amount of the sulfite in water. By the irradiation of an ionizing radiation, the water is activated and ionized. The activated water is easily decomposed to form hydroxide radicals and hydrogen radicals, moreover, electrons resulted from the ionization become to hydrated electrons. The hydroxide radicals themselves have oxidation capacity, and on the other hand, $O^{2-}$ ions (oxygen ions) with high oxidation capacity are resulted from the reactions of the hydrogen radicals and of the hydrated electrons with the oxygen dissolved in water. After all, it is considered that these several kinds of activated radicals, formed by the above mentioned irradiation, oxidize sulfurous acid ions from calcium sulfite to form calcium sulfate.

Another object (B) in the present invention is to provide a novel process for preparing calcium sulfate, characterized by irradiating of an ionizing radiation to the liquid system, containing the above mentioned calcium sulfite and water, which is kept in substantially neutral or an acidic state, in the production of calcium sulfate by oxidizing calcium sulfite.

The above embodiment (B) is characterized in that the effect of the irradiation in the embodiment (A) is strongly intensified and particularly it results in a more considerable effect, comparing to that of the previous invention, from a viewpoint that the inhibiting period (induction period) of the reaction, observed at the beginning of the reaction, can entirely be eliminated. The present invention is, concretely, characterized by the irradiation of an ionizing radiation to the slurry of calcium sulfite with keeping pH at neutral or an acidic state, generally at about 3–6, preferably about 5, if necessary by adding an acidic substance such as an acid or the like, in the oxidation of the calcium sulfite.

BRIEF DESCRIPTION OF THE DRAWING

The attached FIGURE graphically illustrates the formation of calcium sulfate against reaction period of time in the examples and comparative examples of the Embodiment (B).

DESCRIPTION OF THE PREFERRED EMBODIMENT

The above object (A) of the invention is preferably performed in the following way.

An ionizing radiation in the present invention includes typically γ-rays, X-rays, electron beam and the like. The intensity of the radiation, that is, radiation dose rate is in the range of about $10^2$–$10^{11}$ rad/hr. In the irradiation with γ-rays, the dose rate up to about $10^6$ rad/hr is usually reasonable. A larger dose rate, for instance, about $10^8$–$10^{10}$ rad/hr, can be applied in the irradiation with electron beam. While the higher dose rate results in the higher oxidation rate, the optimum dose rate is determined by considering irradiation cost. The amount of air to be bubbled is usually about 0.1–2 liter/min. per liter of the slurry. The concentration of the slurry used can be in the range of about 1–60 (weight/volume g/ml) percent. The slurry with low concentration gives high conversion rate of calcium sulfite to calcium sulfate, but it is preferable to determine the concentration of the slurry, case by case, in order to get maximum yield of calcium sulfate per unit reaction volume. An excess high concentration of calcium sulfite makes flow of the slurry difficult and makes uniform passing of air impossible. The temperature for the irradiation is not especially restricted and not necessary to be so high, but is sufficient at a room temperature. In the bubbling of air, it is preferable to contrive so that the slurry is effectively exposed to the air and flows smoothly. Without irradiation, the formation rate of calcium sulfate is extremely slow as concretely described in examples.

The above object (B) of the invention is preferably performed substantially in the same way as in the above embodiment (A), except for the pH condition in the reaction system.

The effect of the invention is concretely graphically illustrated in the attached FIGURE. Under usual condition, it takes several tenth hours to oxidize most part of calcium sulfite, even if air or oxygen gas is bubbled in the form of fine foams by passing it through a porous plate. By irradiating an ionizing radiation to the slurry under the above situation, the oxidation rate was rapidly increased, yet, under a typical condition, about one half hour of reaction inhibiting period was still remained. However, when the irradiation was carried out with keeping the pH of the reaction system at about 5-3, the reaction inhibiting period completely disappeared and the oxidation reaction was immediately initiated. Several tenth percent of calcium sulfate was already obtained at the initial stage, whereas at which stage the reaction scarcely proceeded when the pH of the liquid was regulated at 8. When a continuous reaction apparatus with industrial scale is designed and operated, the reaction process without reaction inhibiting period described above results in very favorable operating conditions. When no irradiation was carried out at pH = 5, the oxidation reaction was slightly accelerated, but a fairly long reaction inhibiting period was still remained. In the present invention, that is, a synergystic effect of the irradiation and controlling of pH is markedly observed.

Moreover, the utility efficiency of oxygen was further increased by the present invention and it reached to several tenth times as high as that in the conventional process. By the favorable effect, it is possible to sharply reduce the cost of the oxidation reaction of calcium sulfite.

It is preferable to keep the pH of the reaction system at about 5, and, at pH value below 5, sulfur dioxide gas is generated. At the final stage of the reaction, the pH is rapidly decreased to about 3, therefore, the termination of the reaction can be detected by the rapid decrease in pH. In the bubbling of air it is preferable to contrive so that the bubbles can contact to slurry as sufficiently as possible.

The present invention is illustrated hereinafter by working examples, but the scope of the invention should not be limited by these examples.

EXAMPLE 1

The reactor comprises a cylindrical glass vessel, 5 cm dia. and 20 cm long, attached with a porous glass plate at the bottom. 300 ml of slurry comprising 20% by weight calcium sulfite and water by volume the pH of which is about 8 was loaded in the vessel, and was set in a γ-rays irradiation chamber. Then, air under atmospheric pressure was bubbled with the rate of 1.0 l/min. through the porous plate at the bottom. The slurry flows sufficiently and contacts with the air which is bubbled to form fine foams by passing through a porous plate. A $Co^{60}$ γ-rays source, which is stored in water, was elevated up and set at the sides of the reactor, then, the irradiation was initiated. The dose rate of the γ-rays absorbed was $5 \times 10^5$ rad/hr. After the reactions were carried out for various periods as shown in Table 1, samples were taken out to be analyzed by a usual method, and the conversion ratio of calcium sulfite to calcium sulfate was calculated.

On the other hand, another oxidation reaction was carried out, for comparison, under same condition as above except that no irradiation was applied. The results are shown in Table 2. As is evident from these two tables, in the oxidation reaction without irradiation, only 7% of calcium sulfate was obtained after the reaction for 8 hrs (The content of calcium sulfate is 3% before the reaction). But, with irradiation, calcium sulfate was obtained with the yield of 47% after the reaction for 4.5 hrs. Thus, it is clearly shown that, by the irradiation, the formation rate of calcium sulfate increased to about 20 times as high as that without irradiation. Furthermore, the amount of formation of calcium sulfate increases in proportion to the period of time of irradiation.

Table 1

Oxidation of calcium sulfite by irradiation of an ionizing radiation
reaction condition:

| Concentration of the slurry | 20 percent (w/v) |
|---|---|
| Reaction temperature | room temperature (20 – 25°C) |
| Radiation dose rate | $5 \times 10^5$ rad/hr |
| Flow rate of air | 3.3 l/min. per 1l of slurry |

| Reaction time (hr) | Calcium sulfite (weight %) | Calcium sulfate (weight %) | Utility ratio of oxygen (%) |
|---|---|---|---|
| 0 | 94.4 | 3.4 | 0 |
| 1.0 | 81.4 | 14.9 | 4.4 |
| 2.5 | 69.8 | 29.3 | 4.3 |
| 4.5 | 49.2 | 47.6 | 4.4 |
| 9.0 | 6.2 | 92.0 | 4.1 |

Table 2

Oxidation of calcium sulfite with air
reaction condition:

| Concentration of the slurry | 20 percent |
|---|---|
| Reaction temperature | room temperature (20 – 23°C) |
| Flow rate of air | 3.3 l/min. per 1l of slurry |

| Reaction time (hr) | Calcium sulfite (weight %) | Calcium sulfate (weight %) | Utility ratio of oxygen (%) |
|---|---|---|---|
| 0 | 93.4 | 3 | 0 |
| 2 | 93.4 | 2.5 | 0 |
| 4 | 93.9 | 2.9 | 0 |
| 6 | 91.1 | 5.1 | 0.1 |
| 8 | 90.5 | 7.2 | 0.2 |
| 9 | 89.5 | 8.1 | 0.2 |

EXAMPLE 2

The same reactor as that in Example 1 was used, and reaction conditions such as reaction temperature, radiation dose rate, flow rate of air, volume of reaction and the like were set in similar way to those in Example 1, except for that the concentration of slurry was set at 5% which is fairly lower than that in Example 1. The result under the conditions described above is shown in Table 3. From the table, it is evident that the lower concentration of slurry results in the higher conversion rate to calcium sulfate. Since almost 90% of conversion ratio is obtained after 2.5 hrs, the conversion proceeds with the rate of 4 times as high as that with 20% of slurry. However, the yield of calcium sulfate per unit time is almost the same as that with 20% of slurry. Moreover, the formation rate of calcium sulfate in the reaction without irradiation is very low, as shown in Table 4.

Table 3

Oxidation of calcium sulfite by irradiation of an ionizing radiation reaction condition:

| Concentration of slurry | 5% |
| Reaction temperature | room temperature |
| Flow rate of air | 3.3 l/min. per 1l of slurry |
| Radiation dose rate | 5 × 10⁵ rad/hr |

| Reaction time (hr) | Calcium sulfite (weight %) | Calcium sulfate (weight %) | Utility ratio of oxygen (%) |
| --- | --- | --- | --- |
| 0 | 91.9 | 5.5 | 0 |
| 0.5 | 88.8 | 8.0 | 0.7 |
| 1.0 | 52.8 | 44.3 | 4.0 |
| 2.5 | 9.2 | 90.0 | 4.9 |
| 4.0 | 9.2 | 89.8 | 3.1 |

Table 4

Oxidation of calcium sulfite with air reaction condition

| Concentration of slurry | 5% |
| Reaction temperature | room temperature |
| Flow rate of air | 3.3 l/min. per 1l of slurry |

| Reaction time (hr) | Calcium sulfite (weight %) | Calcium sulfate (weight %) | Utility ratio of oxygen (%) |
| --- | --- | --- | --- |
| 0 | 93.6 | 4.2 | 0 |
| 2 | 91.5 | 5.9 | 0.9 |
| 4 | 90.1 | 6.7 | 0.7 |

EXAMPLE 3

The reactor comprises a cylindrical glass vessel, 5 cm dia. and 20 cm long, attached with a porous glass plate at the bottom. 300 cc of slurry with the concentration of calcium sulfite of 5% (w/v) was loaded in the reactor, and 30% sulfuric acid was added to the slurry with stirring, in order to adjust the pH of the slurry to 5. The slurry was set at a fixed position in a Co⁶⁰ γ-rays irradiation chamber. Then, air with atmospheric pressure was bubbled with the rate of 1 l/min. through the porous plate at the bottom. The slurry flows sufficiently and contacts with the air which is bubbled to form fine foams. A Co⁶⁰ γ-rays source was elevated up and the rays was irradiated to the reactor. The radiation dose rate was 5 × 10⁵ rad/hr. After the irradiations for various periods, samples were taken out, and analyzed by a usual method to calculate the conversion ratio of calcium sulfite to calcium sulfate. The results are shown in Table 5.

On the other hand, another oxidation reaction was carried out, for comparison, under the same condition as above except that no irradiation was applied. The results are shown in Table 6. As is evident from these tables, the effect of the irradiation is very considerable, and the oxidation reaction without irradiation does not proceed at all. Even after only 1 hr, the conversion ratio of calcium sulfite to calcium sulfate reaches to 85%, and the reaction almost completes after 2 hrs. Although the effect of the irradiation was observed even in the run without controlling pH of the slurry, a reaction inhibiting period clearly exists and the effect of irradiation at pH = 5 is considerably higher than that without controlling pH. These results are graphically illustrated in the attached FIGURE.

Table 5

Formation of calcium sulfate by irradiation
(Radiation dose rate: 5 × 10⁵ rad/hr)

| Irradiation time (hr) | Calcium sulfite (%) | Calcium sulfate (%) | Utility ratio of oxygen (%) |
| --- | --- | --- | --- |
| 0 | 90.5 | 4.6 | 0 |
| 0.5 | 45.3 | 50.6 | 7.5 |
| 1.0 | 11.8 | 83.9 | 6.9 |
| 2.0 | 1.1 | 95.5 | 4.2 |

Table 6

Formation of calcium sulfate without irradiation

| Irradiation time (hr) | Calcium sulfite (%) | Calcium sulfate (%) | Utility ratio of oxygen (%) |
| --- | --- | --- | --- |
| 0 | 91.1 | 4.5 | 0 |
| 1.25 | 89.5 | 6.1 | 0.1 |
| 2.50 | 89.5 | 6.1 | 0.05 |
| 3.50 | 69.8 | 25.3 | 0.6 |
| 5.00 | 54.4 | 40.5 | 0.7 |

EXAMPLE 4

The characteristics of the example is to use an electron beam for the irradiation. A stirrer and a sintered porous metallic plate were attached to the bottom of the reactor, and the upper part of the reactor was covered by an aluminum plate with 50 $\mu$ thick. The reactor, 10 cm dia. and 10 cm high, is made of stainless steel. 600 cc of the slurry containing 5% (w/v) of calcium sulfite was loaded in the reactor and the pH was regulated at 5. Air with atmospheric pressure was bubbled through the porous plate at the bottom, with the flow rate of 2 l/min., under stirring at the rate of 500 r.p.m. The slurry was irradiated by an electron beam from an electron accelerator with the intensity of 1 MeV and 1 mA, for 20 minutes from the upper part of the reactor. By the irradiation, calcium sulfate, of which concentration was 4.6% before irradiation, was converted to 96.5%.

What we claim is:

1. In a process for preparing calcium sulfate by oxidizing calcium sulfite in an aqueous system comprising said calcium sulfite and water, the improvement comprising adjusting the pH of said system to within the range of 3–6 and, at the same time, irradiating said system with an ionizing radiation selected from the group consisting of γ-rays, X-rays and electron beams at a dose rate in the region of $10^2$–$10^{11}$ rad/hr, thereby increasing the rate of said oxidizing reaction significantly.

2. The process of claim 1, in which said pH value is kept at about 5 during the oxidizing reaction.

3. The process of claim 1, in which said aqueous system is a slurry comprising 1–60 grams of solid per 1 ml of water.

4. The process of claim 1 in which an acidic substance is used to control said pH values.

* * * * *